July 22, 1969   N. T. NOTLEY ETAL   3,457,071
METHOD OF MAKING REVERSAL IMAGES
Filed Feb. 1, 1966
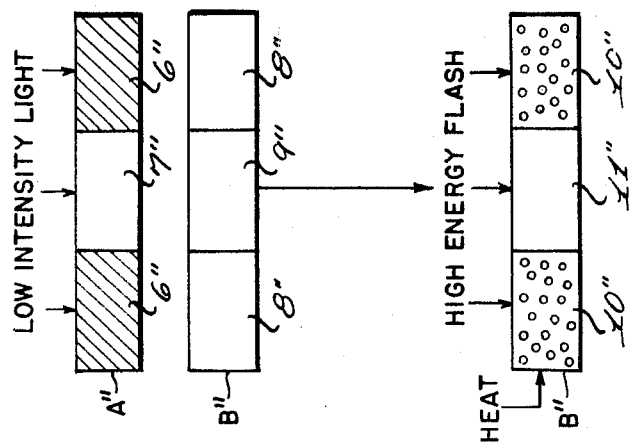
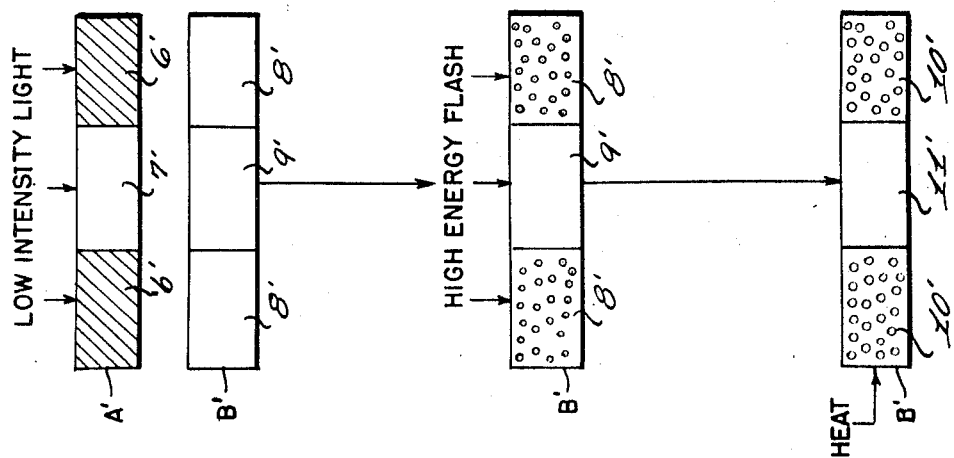
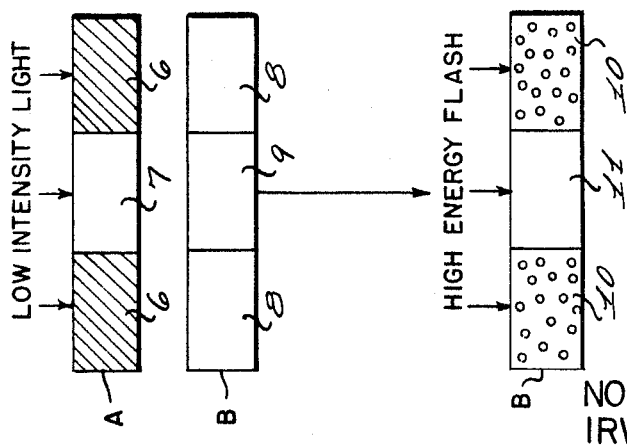
INVENTOR
NORMAN T. NOTLEY
IRWIN M. SENENTZ, JR.
BY
Cushman, Darby & Cushman
ATTORNEYS United States Patent Office 3,457,071
Patented July 22, 1969

3,457,071
METHOD OF MAKING REVERSAL IMAGES
Norman T. Notley, New Orleans, and Irwin M. Senentz, Jr., Metairie, La., assignors to Kalvar Corporation, New Orleans, La., a corporation of Louisiana
Continuation-in-part of application Ser. No. 383,169, July 16, 1964. This application Feb. 1, 1966, Ser. No. 533,743
Int. Cl. G03c 5/54
U.S. Cl. 96—27       12 Claims

ABSTRACT OF THE DISCLOSURE

A process for producing, in vesicular photographic film, images having the same photographic sign as the subject photographed. The film is first exposed image-wise to actinic radiation of relatively low intensity. Then it is exposed uniformly to actinic radiation of high intensity. The second exposure instantly produces an image from sensitizer not consumed during the first exposure. Gas generated by sensitizer decomposition during the first exposure need not be diffused from the film before the second exposure.

---

This is a continuation-in-part of earlier United States application Ser. No. 383,169 filed July 16, 1964 now abandoned.

The present invention relates to photography and, more particularly, to an improved method for making reversal or direct positive or direct negative photographs using vesicular photographic materials.

Reversal images, e.g., in silver photographic materials, are made by "removing" or "erasing" a negative image initially formed by exposure and development. The "erased" photographic material is reexposed to light substantially uniformly so that approximately the same light intensity reaches all areas of the material, which is then developed. Photo-sensitive substance in the material which has not been consumed in making the negative is then activated, and, after development, an image forms which is the direct opposite of that initially obtained, i.e., a positive. In accordance with the present invention, the steps of developing and "erasing" are avoided in a system of reversal photography, and, in the preferred embodiment, the second development step also is omitted.

Vesicular photographic materials as utilized in the present invention are composed of a plastic binder referred to as the vehicle, in which there is dispersed a light-sensitive agent. That agent is of a type which releases gas when exposed to light. Initially the vehicle is hard, but it is of such nature that it can be softened, e.g., by heating, and then rehardened by cooling. During exposure to light, it is maintained in the hard state so that the gas formed on exposure is at first trapped in it defining what might be described as a latent developable image. Then the vehicle is softened or relaxed; this step, which is called development, permits the gas to diffuse through the vehicle and collect in bubbles or "vesicles," which may also expand under the influence of heat. Finally, the vehicle is rehardened, before the bubbles can escape. The bubbles, which might be referred to as cavities, scatter light and hence prevent light being transmitted through the material. The exposed areas are thus rendered opaque to transmitted light. When viewed by reflected light, they appear white. There is thus produced an image corresponding to the light pattern originally projected onto the material.

As used herein, the term "reversal image" refers to photographs of the same sign as the subject photographed. Thus, when used to copy other photographs, a reversal image would be positive when the material copied is a positive and negative when the material copied is negative. The term "direct positive" is used as synonymous with reversal image. This type of photograph also may be referred to as a "direct image." In the case of vesicular photography, a reversal image is one in which the film is transparent in the areas originally struck by light during the first exposure and in which vesicles are formed in areas not struck by light in the first exposure.

A process has been described in U.S. Patent 2,911,299 in which reversal images are obtained in vesicular photographic materials. That process takes advantage of the fact that, prior to development, gas slowly diffuses from the film. If the film is simply stored for a period of 2 to 30 minutes, at ordinary temperatures, the gas diffuses sufficiently that not enough remains to form vesicles. In accordance with the process described in that patent, the film is thus stored and it is then reexposed to light causing the light-sensitive agent which remains to be decomposed to form a latent image which is developed to provide a positive image. The technique described in the patent works quite well but it suffers from the disadvantage that a substantial period of time is consumed in diffusing gas from the film after the initial exposure. This is a handicap when such films are to be utilized in high speed copying equipment. Consequently, a need has existed for a means to minimize the time delay associated with that process.

The present invention is an improvement on that method. It is based upon the discovery that the film may be subject to the successive exposures without any intervening delay, by means of control of the light intensities employed. The film is first exposed to light of relatively low intensity in a camera or similar device and then exposed overall to high intensity light, generally for a correspondingly shorter period of time. In the preferred embodiment, no heat development step is necessary; however, in some cases, the image is improved by heating the film gently during or after the second exposure. The process provides a further advantage in that a second piece of film may be printed at the same time, to produce instantaneously a photograph of opposite sign from the original image. By taking care to insure suitable contact between two pieces of film, during the second exposure, a photograph of the same sign is produced in the film directly exposed to light and the film behind it forms an opposite sign image. Of course, the first film must not have an opaque backing.

The first exposure may or may not produce a developable latent image in the film. That is, were the film to be heat developed after this step, it might or might not produce a visible photographic image, depending on the nature of the film. The second exposure, particularly in the preferred embodiment, is of such nature that it produces a visible image without the film being subjected to the usual development step. Consequently, any latent image formed in the first exposure never is developed. In certain embodiments, the image is improved by subjecting the film to heat development after the second exposure. Such cases require the use of films and conditions which do not cause a developable latent image to form during the first exposure or which cause it to disappear rather quickly, i.e., before the film is ready for the development.

The mechanism by which the process operates is not fully understood. However, the observed results can be explained if the second exposure causes a considerable amount of heat to be generated by release of the heat of decomposition of the sensitizer. Since this heat cannot be dissipated rapidly, it may raise the temperature of the surrounding plastic to permit localized development without other areas (the areas exposed in the first step) being heated. Thus, any latent image formed in the first step is not developed. It has been confirmed that the light need not heat the plastic itself overall since infra-red radiation which would have this effect may be filtered out in the preferred embodiment without preventing image formation. For example, in one experiment, the film was covered with a two-inch layer of solution of copper sulfate in water (13%) which is known to be an efficient infra-red absorption agent. When exposed to a flash lamp, an image formed in essentially the same manner as when unfiltered light was used. In embodiments in which the film is heated gently during the second exposure, the infra-red component of the light used is helpful. However, in that instance, the heat provided would nevertheless be insufficient to heat the film to ordinary development temperatures.

It is considered significant that images may be formed by the second exposure in films which do not produce a developable latent image during the first exposure. This fact is regarded as an indication that the mechanism of the second exposure may be somewhat different from that in the two step expose-develop process more commonly used in vesicular photography.

A wide variety of vehicle materials may be used including many which are not capable of forming a developable latent image during the first exposure. Those preferred are dry, water-resistant, synthetic, water-insoluble, and non-water swelling polymers and include (1) polymers of ester, ether and acetal derivatives of vinyl alcohol, (2) polystyrene and (3) certain polymeric compositions to which plasticizers have been added.

The ester derivatives are generally obtained by polymerization of esters of vinyl alcohol with aliphatic or aromatic carboxylic acids. The aliphatic acids are preferred, the most suitable being lower fatty and unsaturated acids containing up to about six carbon atoms, such as acetic acid, propionic acid, veleric acid, vinyl acetic acid or crotonic acid. However, higher fatty acids such as octanoic may be used, particularly in combination with lower fatty acids. Suitable aromatic acids include benzoic acid, naphthoic acids and phenyl acetic acid. The ester polymers may be obtained from the monomer by any conventional polymerization method, i.e., bulk, solution or aqueous emulsion or dispersion, in the presence of, e.g., a free radical or ionic catalyst, the details of which form no part of the present invention.

The ether derivatives similarly may be made by polymerization of vinyl ether monomer such as vinyl alkyl ethers. Preferred materials are vinyl lower alkyl ethers containing up to six carbon atoms in the alkyl group, such as vinyl methyl ether, vinyl propyl ether, etc. As in the case of the above-described vinyl esters, any type of addition polymerization may be employed, the details of which form no part of the present invention.

Polyvinyl acetals are generally made by reaction between aldehydes and polyvinyl alcohol or polyvinyl esters such as polyvinyl acetate. It is preferred that saturated lower aliphatic aldehydes be employed containing up to six carbon atoms, particularly butyraldehyde and formaldehyde. However, small amounts of higher aliphatic aldehydes or aromatic aldehydes such as benzaldehyde may be included.

It will be appreciated that while the above description of preferred polymers has been directed to homopolymers, copolymers containing more than one acetal, ester or ether group may be used. Thus, polyvinyl acetals may contain two or more types of acetal groups or, e.g., acetate units as well as acetal. In addition, relatively minor amounts of other ethylenically unsaturated monomers containing one or more >C=C< groups may be present in this class of preferred polymers, e.g., up to 5%, as long as the characteristics of the polymer are essentially not altered so as to render it unsuitable.

Any solid, high molecular weight polystyrene may be used. In its preferred form, the polymer is a homopolymer or may contain minor amounts, e.g., up to 5% of other ethylenically unsaturated monomers such as methyl methacrylate. In most cases, larger amounts may be used, as long as the fundamental characteristics of the polymer are not altered so as to render it unsuitable.

The third group of preferred vehicles is composed of polymers which are themselves suitable but which may be compounded to make them more useful for the preferred embodiment of the process. The group includes, for example, copolymers of vinylidene chloride and acrylontrile as described in U.S. Patent 3,032,414. These polymers may be compounded by adding a plasticizer. The plasticizer used should be one which softens the polymer, its choice depending on the nature of the polymer. The amount of plasticizer also will be chosen with relation to the nature of the polymer. In any particular case, the suitability of a polymer-plasticizer composition may be determined by preparing a vesicular film from it and subjecting it to the second exposure to light of relatively high intensity. If an image appears without heating or with only gentle heating as hereinafter defined, but without ordinary heat development, the modification may be regarded as satisfactory. If no image appears, a second sample can be subjected to the same high intensity exposure and followed by heat development in accordance with the embodiment described above. However, in most instances, at least some image will appear without any heating, if heating during or after the high intensity exposure will be useful, although the heating will increase its density and otherwise improve its quality. It will be appreciated that the same test may be used in determining the usefulness of any vehicle material.

The polymers which might be so compounded include those described in James U.S. Patent 3,032,414, Parker et al. Patent 3,161,511, Daech Patent 3,189,455 and Parker et al. application Ser. No. 386,755 filed July 31, 1964, characterized by a permeability constant for nitrogen within the range $8.6 \times 10^{-16}$ and $8 \times 10^{-10}$, said constant being the number of cubic centimeters of nitrogen transmitted at 30° C. by an area of one square centimeter in one second when the pressure gradient is one centimeter of mercury. Such polymers include polyvinylidene chloride, polyvinyl chloride, copolymers of vinyl chloride and vinylidene chloride, vinyl chloride and acrylonitrile, styrene and acrylonitrile, acrylonitrile and 1,1-difluoroethylene, vinylidene chloride and acrylic acid, vinyl acetate and vinylidene cyanide, vinyl chloride and acrylic acid, vinyl chloride and methyl acrylate, vinylidene chloride and ethyl acrylate, vinylidene chlorofluoride and acrylonitrile, vinylidene chloride and methyl methacrylate, vinyl acetate and vinylidene chloride, vinyl alcohol and vinylidene chloride, vinyl chloride and diethyl maleate, and vinyl chloride and vinyl acetate, ethyl cellulose, copolymers of alkyl acrylates and methacrylates with acrylonitrile, polymers of methacrylonitrile, and nylon.

It will be appreciated that while numerous examples have been given, virtually any solid relatively rigid and inelastic plastic, and preferably thermoplastic, material may be used so long as it is sufficiently inelastic and rigid to retain the microscopic gas bubbles or cavities after they have formed. In some cases, softer polymers may be used if a mechanism is provided for hardening them after the vesicles are formed. However, in view of the large number of polymeric materials which are highly satisfactory, the use of such softer materials is regarded for the most part as unnecessary.

The above polymers are substantially uniformly blended with a light decomposable agent, or sensitizer, of the types which are known in the art of vesicular photographic materials which, upon exposure to light, decompose into products which are volatile upon warming to form the above-described radiation scattering cavities. The preferred sensitizers are non-reactive to the vehicle and, upon exposure to light, decompose into products which are chemically non-reactive to said vehicle and which are volatile to form radiation scattering discontinuities only in the light struck areas in said vehicle to thereby furnish a record. Of these preferred sensitizers, those which are especially useful are of the type which decompose to release nitrogen on exposure to light, particularly the diazonium salts. Suitable sensitizers include the diazo compounds which release nitrogen on exposure to light, as disclosed in U.S. Patents 3,032,414, 2,923,703 and 2,976,145, for example, p-diazo diphenylamine sulfate, p-diazo diethylaniline zinc chloride, p-diazo ethyl hydroxyethylaniline zinc chloride, p-diazo ethyl methyl aniline zinc chloride, p-diazo diethyl methyl aniline zinc chloride, p-diazo ethyl hydroxyethylaniline zinc chloride, 1 diazo-2 oxy naphthaline-4 sulfonate, d-diethyl amino benzene diazonium chloride $ZnCl_2$, 4-benzolamino-2-5-diethyl benzene diazonium chloride, p-chlorobenzene-sulfonate of 4-diazo-1 cyclohexylaniline, p-chlorobenzene-sulfonate of 4-diazo-2-methoxy-1-cyclohexylamino benzene, tin chloride double salt of 4-N-methylcyclohexyl-amino-benzene diazonium chloride, p-acetamino benzene diazonium chloride, 4-dimethylamino benzene diazonium chloride, 3-methyl-4-diethyl amino benzene diazonium chloride, 4-morpholino benzene diazonium chloride, 4-piperidyl 2-5-diethoxy benzene diazonium chloride, 1-dimethyl amino napthaline-4-diazonium chloride, 4-phenyl amino diazo benzene diazonium chloride. Other useful sensitizers are those disclosed in British specification 956,336 published Apr. 22, 1964 and having the general formula

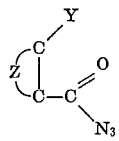

in which Y represents hydroxyl, amino, alkylamine, arylamine, or mercapto and Z represents the atoms necessary to form a cyclic structure, and those disclosed in French Patent 1,281,905 having the general structure

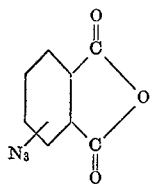

The vehicle and the sensitizer may be combined by any suitable method. However, it is preferred that they each be disolved in a solvent and the resultant solutions combined. In this embodiment it is only necessary that the respective solvents be mutually miscible. For the most part, polar solvents will be used such as alcohols, ketones, nitriles, esters, ethers and halogenated solvents. Particularly useful are methyl, ethyl and isopropyl alcohols, alkyl acetates, acetone, methyl ethyl ketone, dioxane and acetonitrile. However, any inert solvent which meets the above miscibility requirements may be used.

The solution obtained is coated on any suitable backing layer, either transparent or opaque, such as glass, paper, Mylar (oriented polyethylene terephthalate film) polyethylene film or polypropylene film as disclosed in U.S. Patents 2,950,194 and 3,037,862. The solutions are dried by evaporation and the films are ready for use. Thus while the materials are referred to as films herein, it will be appreciated that plates and other supported and unsupported photographic elements are contemplated.

In general, the films are not subjected to the gradation-adjusting pretreatment described in U.S. Patent 3,149,971 in which it is exposed to an aqueous fluid. The treatment preferably is omitted but in some cases it may be used in mild form. The quality of the image obtained, however, tends to decrease as the temperature and/or duration of the treatment is increased. The treatment tends to form a light haze on the film which ordinarily is removed by heating during development. Since the second exposure herein is not followed by development in the preferred embodiment the haze would tend to remain.

The film is initially exposed to light in a camera or in a printing device such that a light image is directed against it but without producing a visible image. In the area struck by light, the sensitizer decomposes and gas is generated. In accordance with one embodiment, the film is exposed to continuous image-defining radiation, and the amount of light striking the film is adjusted so that a proper exposure would require more than 0.1 sec., preferably more than 2.0 sec. The phrases "proper exposure," "correct exposure," and the like as used herein refer to the exposure which will decompose sufficient sensitizer for a "normal density" image if an image is produced. The phrase "normal density" has its accepted meaning but may be defined as a "projection density" of at least about 1.6, "projection density" being equal to the logarithm of the ratio of incident light to specular light transmitted. Generally, the light striking the vehicle will be about 10–1,000 milliwatt seconds per square centimeter in wavelengths to which the sensitizer is responsive. However, this will vary with the sensitivity of the material and its thickness, thicker materials requiring increased exposures. In a camera, this may be controlled by diaphragm adjustment. In a copying device, light intensity is adjusted. It will be appreciated that the correct exposure may be computed from the light intensity, which can be measured by a photo-electric device, and the film speed. Any light source may be used provided only that is supplies light of the wavelength which decomposes the sensitizer and of the proper intensity. For example, most diazo compounds respond only to ultraviolet light so that a high or low pressure mercury arc lamp or a tungsten filament incandescent lamp would be suitable. Certain diazo compounds such as disclosed in U.S. Patents 2,923,703 and 2,976,145 are decomposed by visible light, in which cases lamps which provide little or no ultraviolet light can be used. During the exposure to light, it is not necessary that a developable latent image is formed, as is customary in vesicular photography. However, it is required that the amount of sensitizer decomposed be that which would be sufficient for an image, if produced, to have essentially normal density.

In another embodiment, the light source may be of higher intensity. That is, it may be capable of activating the requisite amount of sensitizer is less han 0.1 second and therefore may be capable of producing an image instantaneously, in the same manner as is done in the second exposure referred to above. However, image formation is avoided by use of a series of flashes or other short duration exposures, each of which is of insufficient duration to form a visible image, and time intervals are allowed between the flashes.

As will be understood, a high intensity light source is capable of causing an image to form instantaneously if the intensity is sufficiently high and the duration of exposure is sufficiently long to supply the necessary energy. Thus, one type of lamp might cause an image to form in $\frac{1}{1500}$ second. If the distance between the lamp and the film is doubled, the exposure time would be increased by a factor of 4, i.e. to $\frac{1}{375}$ second. If the film were exposed for $\frac{1}{1500}$ second to the lamp at the increased distance, no image would form.

In the instant embodiment, the first exposure (image defining exposure) is to relatively high intensity light, i.e. light of such intensity that the required amount of light would reach the film in less than 0.1 second, but the light is applied intermittently. As a result, sensitizer is decomposed, but no image is formed.

This embodiment is considered to supply further evidence in support of the explanation given above for instantaneous image formation during the second exposure. It is thought that the time between the short exposures permits heat to dissipate so that there never is sufficient localized temperature elevation to cause the vehicle to relax and to permit bubbles to form.

The length of the intermittent exposures and the interval between them may be determined by simple experiment. That is, once the correct exposure is computed from the known film speed, the film is subjected to several exposures, the duration of each being a fraction of the total correct exposure, for the light source under evaluation. Generally it is best to use several exposures to be certain that no image will form. Then the film is exposed using different intervals between exposures, until the minimum interval is determined. In practice, one second has been found to be a useful interval when there are six light flashes. The total time required, then, is only about five seconds.

An advantage of this embodiment is that it simplifies equipment. For example, if a flash tube is used for the second exposure, it also can be used in the first exposure by interposing a filter between it and the film or increasing its distance from the film and applying several flashes. Then, the filter is removed or the film is moved closer for the second exposure. Of course, a continuous light source also could be used with a suitable shutter or by moving the film rapidly past a fixed aperture.

In summary, the first exposure decomposes sufficient sensitizer to produce a normal density image, but no image is allowed to form. Either the light is of such low intensity that it requires more than 0.1 second to decompose sufficient sensitizer, or, if it is of higher intensity, it is applied intermittently, with suitable intervals between exposures. The lower intensity illumination may be used continuously or intermittently, but the higher intensity light must be used intermittently.

The second exposure is applied uniformly to the film so that approximately the same light intensity reaches all parts of the film. Light is provided at high intensity usually for a very short period of time. The second exposure in a reversal process may overexpose the film without necessarily being harmful, so that it may not be essential to limit the duration of the second exposure with precision. However, the light must be of sufficient intensity that the film will be fully exposed in a very short time, whether or not the exposure is continued longer. The duration of the exposure may be controlled by the use of a flash of light of relatively short duration, e.g., in a gas discharge tube or other type of flash bulb. The duration of exposure may also be controlled in conjunction with the use of a continuous, high intensity light source by either varying the speed at which the film travels past a fixed aperture or by positioning between the film and the light source a briefly opening shutter. This exposure should be of sufficient intensity that it will expose the film in not more than about 0.2 second, preferably less than 0.01 second and may be of such intensity that full exposure is achieved in 0.0001 second or less. Very satisfactory results are obtained with exposures at 1/1,500 second. The light should be at least sufficient to fully expose the material. As in the first exposure, the spectral composition of the light will be determined by the sensitivity characteristics of the film. There is a further requirement applicable to the duration of the exposures and intensity of light. It will be noted that in the information given above the first exposure may be continuous with low intensity light for 0.1 second or longer and during the second exposure the intensity may be such that as much at 0.2 second may be required. However, it is not intended that the first exposure can be shorter than the time required for the second. These values are ranges which cover all films. It is possible that in one kind of film the duration of the first exposure may be as little as 0.1 second and that, in another kind of film, the intensity during the second exposure will be such that 0.2 second is required to expose the film. For any particular film, the time required for the first exposure will be longer than the time required for the second exposure.

This relationship can be expressed in the equation $$T_1/T_2 = R$$

where the intensity in the first exposure is such that time $T_1$ seconds is required to decompose the required amount of sensitizer and the intensity in the second exposure is such that an exposure of $T_2$ second will produce an image. For any particular film, R is at least 2. Ordinarily it will be at least 100 and preferably it is at least 3000.

It will be appreciated that this equation is applicable only when the first exposure employs continuous illumination. Higher intensity may be used than is indicated by the equation if intermittent light is used, as described above.

In accordance with the preferred embodiment of the invention, the film is not heated during or after the second exposure. It is believed that the high energy of the flash increases the energy of the gas as released and causes some adiabatic heating in areas of the vehicle where sensitizer is decomposed causing an image to develop spontaneously. This procedure is achieved particularly by use of vehicles of the types (1), (2) and (3) described above.

In certain instances, it is desirable to apply external heat to improve the quality of the image. With few exceptions, at least some image will be observed without application of heat, i.e., some areas of the film will be more dense than others, but the density may be increased by external heat. This heat may be applied during or after the second exposure with the choice depending on the vehicle. In any particular case, the value of heating can be determined by a few test exposures. When heat is applied during the second exposure, it it relatively mild, in the range of room temperature (65–75° F.) to about 180° F. When heat is applied after the second exposure, it is generally the kind of heat used during ordinary development, i.e., at about 180–300° F. for 2–0.1 second. It is preferred that the development in this form of the invention commence within about five seconds of the high intensity exposure since gas diffusion thereafter will reduce the density of the photograph ultimately obtained. Somewhat larger delays may be tolerable in certain instances since the image deteriorates only gradually with time. This procedure is particularly useful with vehicles of type (4) described above. This procedure was found useful especially in Example 3 where cellulose acetate/butyrate was used.

The respective embodiments of the invention are illustrated in the drawing in which FIGURE 1 is a flow diagram of the aforesaid preferred embodiment in which no heat is applied;

FIGURE 2 is a flow diagram of the embodiment in which there is a separate heat-development step following the high intensity exposure; and FIGURE 3 is a flow diagram of the embodiment in which mild heat is applied to the film during the second exposure.

In the embodiment illustrated in FIGURE 1 a vesicular film B is placed against a transparency A, e.g., in a contact printer, and exposed to light. For simplicity, the transparency is shown as comprising opaque areas 6 and clear area 7. Light passes through the clear area and strikes the area 9 of the film while no light strikes the areas 8. At this time no image is formed but the light decomposes the sensitizer in area 9. The film is then separated from the transparency and exposed uniformly to light from a high intensity flash while remaining essentially at room temperature. Sensitizer in areas 8 of the film are thereby exposed and vesicles appear, forming the opaque areas designated by 10. Since the sensitizer had previously been decomposed in area 9, no vesicles are formed and there remains a clear area designated by 11.

This embodiment is illustrated by the following example, all parts being by weight. The resultant mixed solution was applied to a sheet of Mylar (oriented polyethylene terephthalate) and allowed to dry.

The film obtained was placed against a transparency and exposed to light from a mercury vapor lamp for 2.0 seconds. It was then separated from the lamp and reexposed to a flash of light of duration about $1/1,500$ second. A positive image appeared promptly, corresponding to the transparency.

In the embodiment shown in FIGURE 2, a transparency A' having opaque and clear areas 6' and 7' and a film B' are exposed to light of low intensity, leaving undecomposed sensitizer in areas 8' but not in area 9'. The film is then separated and exposed to a high intensity light flash. Initially no image appears. However, the film is then heated to about 260° F. for 0.5 second and vesicles are formed in areas 10' but not in areas 11'.

In FIGURE 3, the steps are essentially the same as in FIGURE 1 except that film is heated gently during the second exposure.

The invention is illustrated by the following examples which are provided as representative of various embodiments thereof, no limitation thereto being intended. All parts are given by weight.

EXAMPLE 1

25 gms. of formaldehyde polyvinyl acetal of composition, 82% acetal content, 9.5–13.0% acetate content, and 5.0–6% hydroxyl content, was dissolved in 200 gms. of 1,4-dioxane to produce a solution A. A separate solution B was made from 2.7 gms. of p-diazo N,N-dimethyl aniline boro-fluoride salt, 64 gms. of methanol and 20 gms. of distilled $H_2O$. The two solutions were mixed thoroughly and were then coated onto a Mylar backing by means of a Gardner film coating knife and a Bird vacuum plate. The film was then processed by first exposing through an image bearing transparency for about 10 seconds to a 100 watt ultraviolet lamp (General Electric No. H100A4–IT) spaced about 3 inches from the film and immediately thereafter to a flash lamp (General Electric 200 watt second and within a polished reflector, the film being at the edge of the reflector and about 3 inches from the flash tube, the flash duration being $1/1500$ second). The images obtained showed a maximum projection density of 2.70 and a minimum of 0.20.

Examples 2–7 are compositions which were prepared, coated on Mylar and exposed as in Example 1, with approximately the same results.

EXAMPLE 2

Solution A

Formaldehyde polyvinylacetal (50% acetal, 40–50% acetate, 5.0–6.5% hydroxyl) _____ 25
Methyl ethyl ketone _____ 100

Solution B p-Diazo-N,N-dimethyl aniline boro fluoride salt ____ 3
Acetonitrile _____ 35

EXAMPLE 3

Solution A

Cellulose acetate butyrate _____ 25
Methanol _____ 25
Methyl ethyl ketone _____ 75

Solution B p-Diazo N,N-dimethyl aniline zinc chloride salt ____ 3.4
Acetonitrile _____ 24

EXAMPLE 4

Solution A

Butyraldehyde polyvinyl acetal (80% acetal, 0–1% acetate, 18.0–20% hydroxyl) _____ 25
1,4-dioxane _____ 260

Solution B p-Diazo N,N-dimethyl aniline zinc chloride salt ____ 4.2
Acetonitrile _____ 35

EXAMPLE 5

Polystyrene (amorphous) _____ 20
Methyl ethyl ketone _____ 80
p-Diazo, N,N-dimethyl aniline boro fluoride salt [1]___ 2

[1] Dissolved separately with a portion of the methyl ethyl ketone and then mixed with a solution of the polystyrene in the remainder of the methyl ethyl ketone.

EXAMPLE 6

Isotactic polystyrene _____ 20
1,1,2,2-tetrachloro ethane _____ 640
p-Diazo N,N-diethyl aniline boro fluoride salt.[1]

[1] Dissolved separately in a portion of the 1,1,2,2-tetrachloroethane and then mixed with a solution of the polystyrene in the remainder of the tetrachloroethane.

EXAMPLE 7

Solution A

Butyraldehyde polyvinyl acetal (80% acetal, 0–2.5% acetate, 18–20% hydroxyl) _____ 25
1,4-dioxane _____ 125

Solution B p-Diazo N,N-dimethyl aniline zinc chloride salt ____ 4
Acetonitrile _____ 40

EXAMPLE 8

The following composition was prepared and coated on Mylar as in Example 1.

Solution A

Formaldehyde polyvinyl acetal (82% acetal, 9.5–13.0% acetate, 5.0–6.0% hydroxyl) _____ 25
1,4-dioxane _____ 50

Solution B p-Diazo N,N-dimethyl aniline boro fluoride salt ____ 2
Acetonitrile _____ 43

Samples were exposed as in Example 1 and images were obtained with a projection density of 1.30. A second group of samples was exposed as in Example 1 and then heated immediately after the second exposure to 240° F. for 2 seconds. A projection density of 2.50 was obtained.

EXAMPLE 9

The following composition was prepared and coated on Mylar as in Example 1.

Solution A

Saran F–120 _____ 25
Methyl ethyl ketone _____ 125
Acryloid _____ 11.3
Diallyl phthalate _____ 1.0

Solution B p-Diazo-N,N-dimethyl aniline zinc chloride salt ____ 1.5
Acetonitrile _____ 17.5

The groups of samples were exposed and processed as described in Example 8, using, however, for the first exposure, a 500 watt tungsten lamp spaced about 3 inches from the film and an exposure of about 20 seconds. The film exposed but not heated showed a projection density of 0.8 as compared to 2.3 for film exposed and subsequently heated to 240° F. for 2 seconds.

EXAMPLE 10

A composition having the following constituents was prepared and coated on Mylar as described in Example 1.

11

Solution A

| | |
|---|---|
| Butyraldehyde polyvinyl acetal (88% acetal, 0–2.5% acetate, 9.0–13.0% hydroxyl) | 25 |
| 1,4-dioxane | 200 |

Solution B

| | |
|---|---|
| p-Diazo N,N-dimethyl aniline zinc chloride salt | 4.2 |
| Acetonitrile | 35.2 |

Two groups of samples were exposed successively for 2.0 and 1/1500 second as described in Example 1. One group of samples was heated gently to about 120° F. during the second exposure while the other group was not. The minimum projection density was 0.2 for the samples which had been heated as compared with 0.6 for those which had not.

EXAMPLE 11

Twenty-five grams of formaldehyde polyvinyl acetal of composition, 82% acetal content, 9.5–13.0% acetate content, and 5.0–6% hydroxyl content was dissolved in 200 grams of 1,4-dioxane to produce a solution A. A separate solution B was made from 3.4 grams of p-diazo N,N-dimethyl aniline zinc chloride salt and 24 grams acetonitrile. The two solutions were mixed thoroughly and were then coated onto a Mylar backing by means of a Gardner film coating knife and a Bird vacuum plate. The film was then processed by first exposing through an image bearing transparency with six flashes, each spaced one second apart, from a 40 watt-second flash lamp in a polished reflector spaced about three inches from the film. It was noticed that while the total time of exposure to light from the flashes was less than 0.01 second, no density was produced in the film if the flashes were spaced one second apart. If the intensity of the lamp was increased or the time between flashes reduced, a density was produced in the film. Thus, the time required to produce an exposure as contemplated by this invention was about six seconds and not the 6/1500 represented by the sum of the flash durations. The film was then exposed to a 200 watt-second flash lamp in a polished reflector three inches from the film, the flash duration being 1/1500 second. The images obtained showed a maximum projection density of 2.70 and a minimum of 0.22.

The invention having been described by reference to preferred embodiments, it will be understood that it is not limited thereto but is subject to certain modifications and changes without departing from the scope thereof.

What is claimed is:

1. A process for making vesicular photographic images having the same photographic sign as the subject photographed in a vesicular photographic material capable of furnishing a record solely in the form of a distribution pattern of radiation scattering cavities formed within an otherwise substantially homogeneous vehicle, said material being in the form of a solid, relatively rigid and inelastic plastic material having uniformly dispersed therein a light decomposible agent which, upon exposure to light, decomposes into a product which is volatile upon warming to form said radiation scattering cavities, said method comprising exposing said vesicular photographic material to image defining light without forming an image therein, and then before said volatile product has substantially diffused from said vehicle, exposing said vesicular photographic material to substantially uniform high intensity light, the light being of such intensity that it is capable of decomposing sufficient of the undecomposed light decomposable agent to form a visible record of the same photographic sign as said image forming light in a time interval less than about 0.2 second.

2. A process for making vesicular photographic images as set forth in claim 1 in which the exposure to image defining light uses continuous illumination with relatively low intensity light for at least about 0.1 second, the intensities of said image forming light and said uniform light being such that the ratio of the duration of said exposure to image forming light to said time interval is at least 2:1.

3. A process for making vesicular photographic images as set forth in claim 2 in which said ratio is at least about 100:1.

4. A process for making vesicular photographic images as set forth in claim 3 in which said ratio is at least about 1500:1.

5. A process for making vesicular photographic images as set forth in claim 2 in which the exposure to image defining light is for at least about 2.0 seconds.

6. A process for making vesicular photographic images as set forth in claim 1 in which the exposure to image defining light uses a series of exposures of short duration.

7. A process for making vesicular photographic images as set forth in claim 6 in which the intensity of said image defining light is sufficient to be capable of decomposing, in less that 0.1 second, the amount of sensitizer required to be decomposed to produce a normal density image, but image formation is prevented by limiting the duration of each of said series of exposures to less than the time required for decomposing said amount of sensitizer.

8. A process for making vesicular photographic images as set forth in claim 1 in which the intensity of said uniform light is such that it is capable of decomposing sufficient of the undecomposed light decomposable agent to form a visible record in less than about 0.01 second.

9. A process for making vesicular photographic images as set forth in claim 1 in which said light decomposable agent decomposes to form nitrogen upon exposure to light.

10. A process for making vesicular photographic images as set forth in claim 9 in which said light decomposable agent is a diazonium salt.

11. A process for making vesicular photographic images as set forth in claim 1 in which the vesicular photographic material is first exposed to image defining light from a mercury arc lamp for at least about 0.5 second and it is then exposed to substantially uniform light from a flash tube.

12. A process for making vesicular photographic images as set forth in claim 1 in which said vesicular photographic material is first exposed to image defining light from an incandescent lamp for at least about 0.5 second and it is then exposed to substantially uniform light from a flash tube.

References Cited

UNITED STATES PATENTS

| | | | |
|---|---|---|---|
| 2,911,299 | 11/1959 | Baril et al. | 96—49 |
| 3,158,480 | 11/1964 | Adkisson et al. | 96—49 XR |
| 3,298,833 | 1/1967 | Gaynor | 96—27 |
| 3,355,295 | 11/1967 | Priest | 96—49 XR |

FOREIGN PATENTS 645,825  11/1950  Great Britain.

NORMAN G. TORCHIN, Primary Examiner

C. BOWERS, Assistant Examiner

U.S. Cl. X.R.

96—48, 49, 75